Aug. 19, 1941.   A. Z. MAMPLE   2,253,187
TESTING GAS FOR THE DETECTION OF CARBON MONOXIDE
Filed July 6, 1937   2 Sheets-Sheet 1

Inventor
Adolph Z. Mample

Eugene C. Brown
Attorney

Aug. 19, 1941.  A. Z. MAMPLE  2,253,187
TESTING GAS FOR THE DETECTION OF CARBON MONOXIDE
Filed July 6, 1937   2 Sheets-Sheet 2
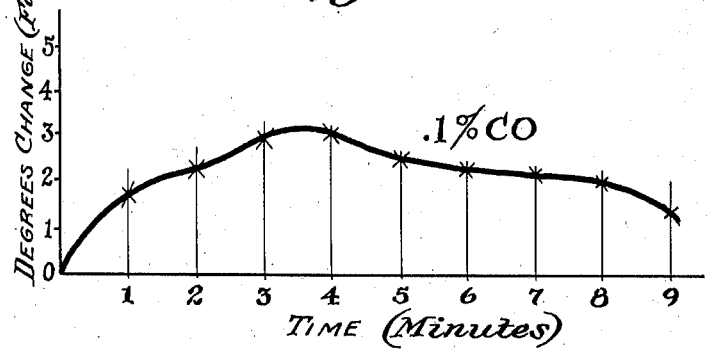
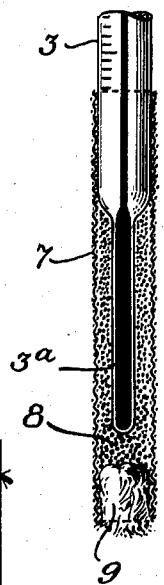
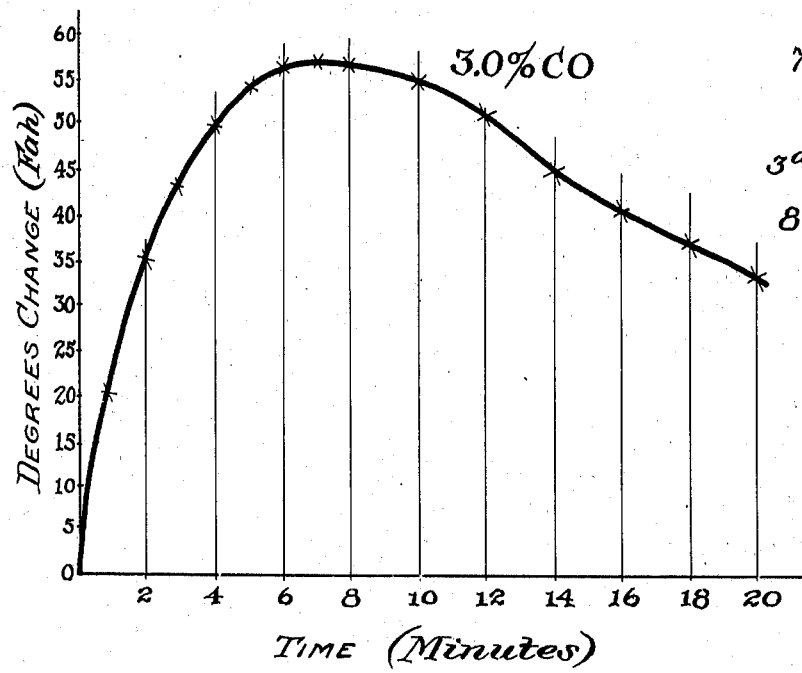
Inventor
Adolph Z. Mample
Eugene C. Brown
Attorney Patented Aug. 19, 1941

2,253,187

UNITED STATES PATENT OFFICE 2,253,187

TESTING GAS FOR THE DETECTION OF CARBON MONOXIDE

Adolph Z. Mample, Glen Rock, N. J., assignor to The Western Union Telegraph Company, New York, N. Y., a corporation of New York Application July 6, 1937, Serial No. 152,181

3 Claims. (Cl. 73—51)

This invention relates to a method of and apparatus for testing gases and more particularly for the detection and quantitative determination of carbon monoxide in air or gas-air mixtures.

It is known that minute quantities of carbon monoxide, even as small as four to ten parts in ten thousand parts of air is hazardous to human life. One object of the invention is to provide a means of detecting the presence of CO gas in confined places, such as manholes, test houses, cable vaults, excavations, etc., before the engineers or workmen are required to enter. At the present time there is no apparatus or device available for accurately and simply detecting carbon monoxide in the lower concentrations below the combustible range except that which is exceedingly complicated, costly and heavy.

Another object is to determine with reasonable accuracy the relative percentage or concentration of CO in the space or chamber under test.

A further object of this invention is to provide an apparatus which is very sensitive and effective and may be readily operated by the ordinary mechanic or workman.

In carrying out the objects of this invention, I provide a suitable "contact catalyst" capable of adsorbing certain gases at ordinary or room temperatures which produces heat upon coming into contact with a gas by the adsorption of the gases to be detected. The thermal change produced by the heat of adsorption may be employed to operate a thermometer, an expansible member to operate an electrical circuit or other similar indicating or signalling device.

For the purpose of clearly disclosing this invention, I shall refer in the following description to the accompanying drawings, in which—

Figure 2 is an enlarged fragmentary view of the bulb end of my detecting thermometer and showing in section the arrangement of the catalytic attachment in which the bulb is encased.

Figures 3 and 4 are graphs illustrating the variations in the readings of the indicating thermometer when subjected to different percentages of carbon monoxide.

Figure 1:
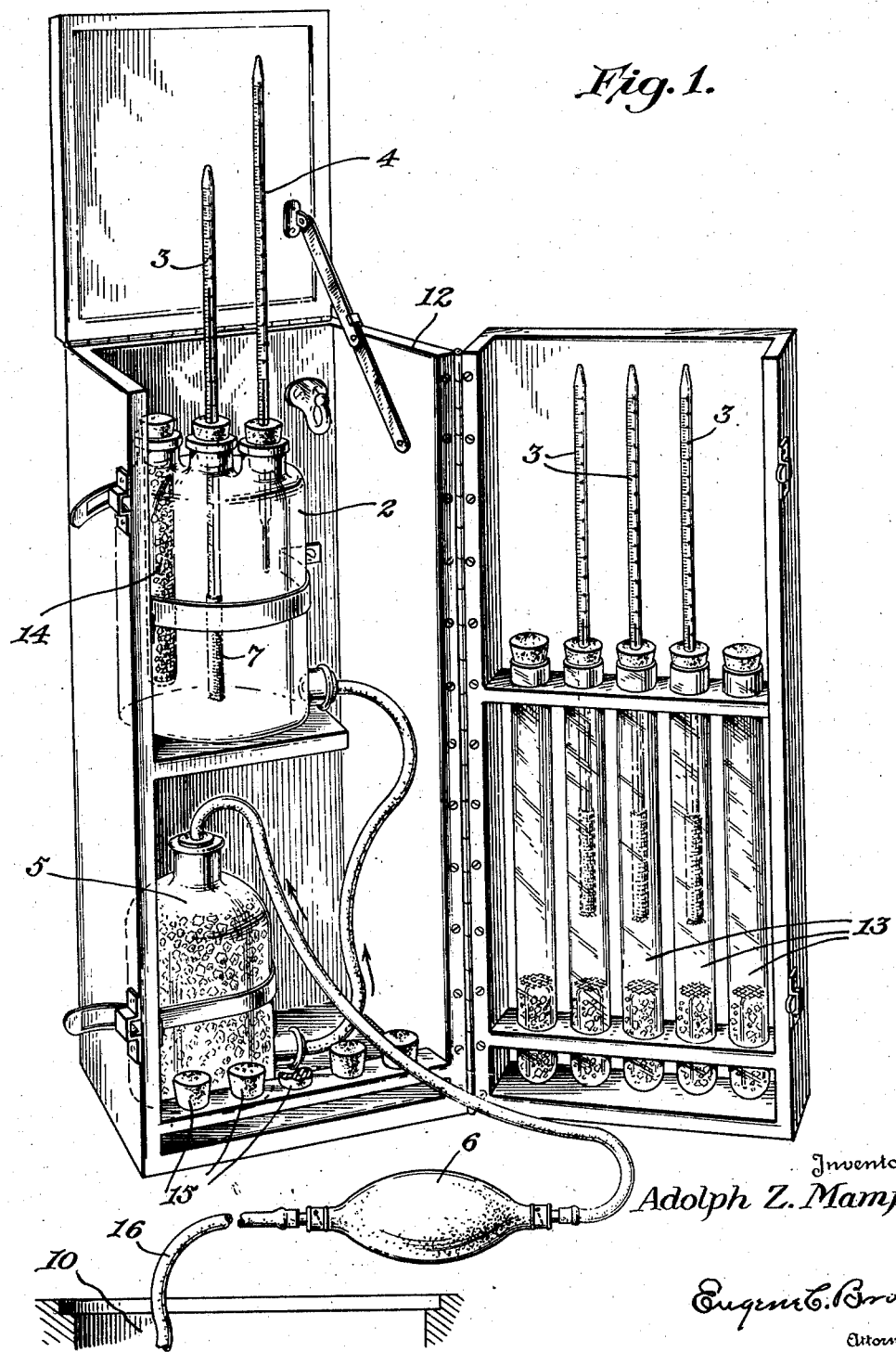
Figure 1 is a perspective view of an apparatus which may be employed to detect the presence of carbon monoxide and to determine the relative degree of concentration of CO in the gas or atmosphere being tested.

I have discovered that "platinum black," when brought into an atmosphere containing carbon monoxide, exhibits the phenomenon of adsorption in which the carbon monoxide gas disappears on the surface of the platinum black, thereby producing a temporary rise in temperature. This heat, produced by the adsorption of the gas, should not be confused with the usual term of "heat of adsorption" which, technically, means the measured or specified test temperature and the amount of gas adsorbed at that temperature. Neither should the action of adsorption or "contact catalyst" previously described be confused with the known action of certain substances such for instance as platinum sponge, when employed as catalysts to cause, or assist in the combustion of combustible gases. In such cases, the temperatures are produced by the chemical combination resulting from the combustion of the gases, which continues until all of the combustible gases have been consumed. The phenomenon I have discovered, therefore, to the contrary, involves no combustion or chemical change, but rather a temporary rise in temperature due to the formation of a film of the carbon monoxide gas on the surface of the platinum black, believed to be a mono-molecular film, which action is probably caused by molecular affinity, a condition physical or static in nature. The action described is readily apparent with low or even minute concentrations of carbon monoxide, and it is in the range of such concentrations of the gas that the use of this invention is particularly intended.

Various types of contact catalysts, such as platinum black, which exhibit the phenomenon I have described may be employed, but platinum black which has been activated in the manner described and claimed in my application, Serial No. 153,862, patented September 26, 1940, No. 2,219,261, is preferred. When the platinum black is exposed to an atmosphere containing CO, the temperature gradually rises to a maximum and then falls more gradually until it reaches its initial temperature. I have illustrated in Fig. 3 the temperature change which is produced when the platinum black is exposed to an atmosphere containing .1% CO. It will be observed that there was a temperature rise of three degrees F. in about three and one-half minutes, followed by a more gradual decrease. Fig. 4 shows the rise in temperature when the platinum black was immersed in an atmosphere containing 3% of carbon monoxide. A maximum temperature rise of 53.5 degrees F. was reached in six minutes which was followed by a gradual decline.

My platinum black detector may be used repeatedly in low concentrations of carbon monoxide or in high concentrations if exposed to the higher concentrations for short periods of time only. In order to restore its sensitivity, it is only necessary to aerate the contact catalyst for a short period of time and dehydrate it after use. In order to obtain a greater degree of sensitivity and a consequent greater rise in temperature, the platinum black should be activated as described and claimed in my said patent.

I have illustrated in Fig. 1, an apparatus which may be employed to detect carbon monoxide and to determine approximately the degree of concentration of CO in the gas mixture or atmosphere to be tested. My carbon monoxide gas detector comprises a test bottle or jar 2, a test thermometer 3 and reference thermometer 4 which extend into the bottle, a dehydrator and heat exchanger 5, containing calcium chloride, and an aspirator 6 for withdrawing a sample of the atmosphere to be tested, from the manhole 10 and passing it through the combined dehydrator and heat exchanger into the test bottle.

The test thermometers employed in my gas detectors are preferably constructed with elongated narrow bulbs 3a as indicated in Fig. 2. It will be appreciated that the ratio of the surface area of the bulb to the volume of mercury should be relatively large in order to obtain maximum readings on the scale of the thermometer. I have found that a bulb one inch in length and one-eighth of an inch in diameter gives satisfactory results. The lower end of the thermometer is encased in a fine mesh cylinder 7 preferably of phosphor bronze wire of about 350 mesh, which serves as a basket. This is filled with finely divided or powdered platinum black 8, constituting the "contact catalyst," the lower end of the basket being closed in any suitable manner, as by means of a plug or pellet of cotton 9. Phosphor bronze makes a satisfactory basket container for the contact catalyst in that it does not absorb the heat of adsorption, which is obviously limited when testing for minute concentrations of the gas. The test thermometers 3 and the reference thermometer 4 may be conveniently placed in a rack provided in the carrying case 12, when not in use. In order that they may be perfectly dry at all times, they are suspended in tubes 13 containing a quantity of calcium chloride. A mesh container 14 filled with calcium chloride is also suspended in the test jar 2 in order that it may be free from moisture. When the apparatus is not in use the stopper openings are closed with solid corks or stoppers 15.

When the air in a manhole is to be tested for the presence of carbon monoxide, one of the stoppers is removed from the bottle or jar 2, the tube portion 16 is lowered into the manhole and the bulb aspirator 6 is manually operated to draw the air from the manhole and pass it through the dehydrator and heat exchanger 5 into the bottle 2 until the air in the latter has been entirely replaced by the air drawn from the manhole. A test detector thermometer 3 and the reference thermometer 4 are then removed from the tubes in the rack and inserted in the bottle in the manner indicated in Fig. 1. It will be observed that the air taken from the manhole is thoroughly dehydrated in passing through the calcium chloride in the dehydrator 5 and furthermore that as it percolates through the tortuous passages and crevices of the calcium chloride, it is brought to the same temperature as the apparatus.

I have determined that varying temperatures and humidity conditions affect the adsorption of the carbon monoxide by the contact catalyst to such an extent as to completely nullify its accuracy and usefulness under certain conditions. Since the temperature and humidity of the atmospheres in manholes, cable vaults, sewers, excavations, etc. will always be different from that of the prevailing temperature and humidity of the atmospheres outside such locations. I have introduced a heat exchanger and dehydrator to accomplish the dual purpose of equalizing the temperature of the gas sample to that of the apparatus or prevailing atmospheric temperature outside of the confined spaces being tested and, at the same time, dehydrating the sample of gas. Thus, errors due to differences of temperature are eliminated by the heat exchanger raising or lowering the temperature of the gas sample as the case may be and likewise eliminating errors due to variations in humidity, provided the test thermometers are always maintained in dehydrating tubes prior to insertion in the dehydrated sample of gas.

It is characteristic of the phenomenon of adsorption that the rise in temperature takes place rapidly, rising to a maximum in a few minutes and then returning more slowly to equilibrium with the surrounding atmosphere, the heat being dissipated by radiation, convection and conduction. In making a test for the presence of carbon monoxide, therefore, as soon as the test and reference thermometers have been inserted in the test bottle filled with a sample of the atmosphere to be tested, the test thermometer must be observed continuously until it reaches its maximum reading which usually requires two or three minutes. The scale reading on the reference thermometer is then subtracted from the maximum scale reading on the test thermometer and the difference between the two readings gives the true temperature rise produced by the adsorption of the contact catalyst.

The temperature rise obtained in accordance with the above procedure is a measure of the concentration of carbon monoxide present in the manhole atmosphere. In practice the readings thus obtained are interpreted as follows: If the differential of the readings on the two thermometers shows a rise less than one degree Fahrenheit, work may proceed in the manhole with safety; if the rise in temperature is between one and three degrees F., workmen may proceed in the manhole with caution for about three quarters of an hour; but if the rise in temperature is more than three degrees the manhole atmosphere should be considered dangerous and should not be entered until it is thoroughly ventilated.

I have described in detail the apparatus and arrangements illustrated for the purpose of disclosing one embodiment of my invention and the manner of using the same in the practice of my method of detecting toxic gases and determining the approximate degree of concentration of the toxic gas constituent in the atmosphere or gaseous medium under consideration, but it should be understood that I do not intend to limit my invention to the construction of the apparatus shown nor to confine the method involved to an indication of the thermal change solely by the use of thermometers.

I claim:

1. A method of detecting the presence of carbon monoxide below the combustible range in the atmosphere or gaseous medium of a confined space which comprises dehydrating a sample portion of the atmosphere taken from said confined space, equalizing the temperature of said portion to that of the prevailing atmospheric temperature outside of said confined space, filling a container with said dehydrated temperature-equalized portion from said confined space, introducing into said container a test thermometer having its fluid containing bulb provided with a covering of platinum black, sealing said container and noting any change in the reading of said thermometer due to adsorption of carbon monoxide by the platinum black.

2. A method of quantitive determination of low concentrations of carbon monoxide below the range of inflammability in the atmosphere of a confined space, which comprises dehydrating a sample portion of the atmosphere taken from said confined space, equalizing the temperature of said portion to that of the prevailing atmospheric temperature outside of said confined space, filling a container with said dehydrated temperature-equalized portion, inserting in said container a temperature indicator provided with an envelope of dehydrated platinum black, sealing said container and measuring the degree of change in temperature of the platinum black due to adsorption of carbon monoxide.

3. A method of quantitive determination of low concentration below the range of inflammability of toxic carbon monoxide, in the atmosphere of a confined space, such as a manhole, which comprises dehydrating a sample portion of the atmosphere taken from said confined space, equalizing the temperature of said portion to that of the prevailing atmospheric temperature outside of said confined space, filling a container with said dehydrated temperature-equalized portion, inserting in said container a reference thermometer, and a test thermometer, the latter having its fluid containing part surrounded by dehydrated platinum black, sealing the container, noting the temperature reading of the reference thermometer and the temperature of the test thermometer after a predetermined time interval, and determining from the differential of said readings the change in temperature of the platinum black due to the adsorption of carbon monoxide.

ADOLPH Z. MAMPLE.